(12) United States Patent
Seo

(10) Patent No.: US 12,455,690 B2
(45) Date of Patent: Oct. 28, 2025

(54) PAGE BUFFER, SEMICONDUCTOR MEMORY HAVING THE SAME, AND OPERATING METHOD THEREOF

(71) Applicant: SK hynix Inc., Icheon-si (KR)

(72) Inventor: Han Seo, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 432 days.

(21) Appl. No.: 18/077,915

(22) Filed: Dec. 8, 2022

(65) Prior Publication Data

US 2024/0036742 A1 Feb. 1, 2024

(30) Foreign Application Priority Data

Jul. 28, 2022 (KR) .................. 10-2022-0093599

(51) Int. Cl.
G06F 3/06 (2006.01)

(52) U.S. Cl.
CPC .......... *G06F 3/0619* (2013.01); *G06F 3/0656* (2013.01); *G06F 3/0673* (2013.01)

(58) Field of Classification Search
CPC ..... G06F 3/0673; G06F 3/0656; G06F 3/0619
USPC .................................................. 365/185.21
See application file for complete search history.

(56) References Cited

U.S. PATENT DOCUMENTS

| | | | | |
|---|---|---|---|---|
| 10,176,871 | B2 * | 1/2019 | Missiroli | G11C 16/32 |
| 2016/0172012 | A1 * | 6/2016 | Lim | G11C 7/1048 |
| | | | | 365/189.05 |
| 2018/0082734 | A1 * | 3/2018 | Lee | G11C 11/4094 |
| 2020/0381055 | A1 * | 12/2020 | Ko | G11C 11/5671 |
| 2022/0328114 | A1 * | 10/2022 | Chai | G11C 7/1039 |
| 2023/0154553 | A1 * | 5/2023 | Lee | G11C 16/102 |
| | | | | 365/185.22 |
| 2023/0168820 | A1 * | 6/2023 | Wan | G11C 16/26 |
| | | | | 711/103 |

FOREIGN PATENT DOCUMENTS

| KR | 1020080038915 A | 5/2008 |
|---|---|---|
| KR | 1020180036880 A | 4/2018 |

* cited by examiner

*Primary Examiner* — Sung Il Cho
(74) *Attorney, Agent, or Firm* — WILLIAM PARK AND ASSOCIATES LTD.

(57) ABSTRACT

A page buffer, a semiconductor memory having the same, and an operating method thereof are provided. The page buffer includes a first current supply circuit connected to a bit line, the first current supply circuit connecting or blocking a power voltage node to or from a common sensing node based on a potential level of the bit line; a second current supply circuit for controlling a potential level of a sensing node based on a current amount of the common sensing node; and a latch unit for latching data based on a potential of the sensing node.

20 Claims, 7 Drawing Sheets

PAGE BUFFER, SEMICONDUCTOR MEMORY HAVING THE SAME, AND OPERATING METHOD THEREOF

CROSS-REFERENCE TO RELATED APPLICATION

The present application claims priority under 35 U.S.C. § 119(a) to Korean patent application number 10-2022-0093599, filed on Jul. 28, 2022, in the Korean Intellectual Property Office, the entire disclosure of which is incorporated herein by reference.

BACKGROUND

1. Technical Field

The present disclosure generally relates to an electronic device, and more particularly, to a page buffer, a semiconductor memory having the same, and an operating method thereof.

2. Related Art

A semiconductor memory device is a memory device implemented using a semiconductor, such as silicon (Si), germanium (Ge), gallium arsenide (GaAs), or indium phosphide (InP). The semiconductor memory device may be generally classified into a volatile memory device and a nonvolatile memory device.

The volatile memory device is a memory device in which stored data disappears when the supply of power is interrupted. Examples of volatile memory devices include a Static Random Access Memory (SRAM), a Dynamic RAM (DRAM), a Synchronous DRAM (SDRAM), and the like. The nonvolatile memory device is a memory device in which stored data is retained even when the supply of power is interrupted. Examples of nonvolatile memory devices include a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like. The flash memory is generally classified into a NOR type flash memory and a NAND type flash memory.

SUMMARY

In accordance with an aspect of the present disclosure, there is provided a page buffer including: a first current supply circuit connected to a bit line, the first current supply circuit configured to connect or block a power voltage node to or from a common sensing node based on a potential level of the bit line; a second current supply circuit configured to control a potential level of a sensing node based on a current amount of the common sensing node; and a latch unit configured to latch data based on a potential of the sensing node.

In accordance with another aspect of the present disclosure, there is provided a semiconductor memory device including: a memory block including a plurality of memory strings; a voltage generating circuit configured to, in a read operation, generate: a source line voltage, which is to be applied a source line of the memory block; and a read voltage and a pass voltage, which are to be applied to word lines of the memory block; a bit line potential adjusting circuit connected to bit lines of the memory block, the bit line potential adjusting circuit performing initial setting by discharging a potential level of the bit lines in the read operation; and a read/write circuit connected to the bit lines, the read/write circuit sensing data by amplifying a current amount that is applied to a common sensing node based on the potential level of the bit line.

In accordance with still another aspect of the present disclosure, there is provided a semiconductor memory device including: a memory block including a plurality of memory strings; a voltage generating circuit configured to, in a read operation, apply a ground voltage to a source line of the memory block and generate a read voltage and a pass voltage, which are to be applied to word lines of the memory block; a bit line potential adjusting circuit connected to bit lines of the memory block, the bit line potential adjusting circuit performing initial setting by precharging a potential level of the bit lines to a certain level in the read operation; and a read/write circuit connected to the bit lines, the read/write circuit sensing data by amplifying a current amount that is applied to a common sensing node based on the potential level of the bit line.

In accordance with still another aspect of the present disclosure, there is provided a method of operating a semiconductor memory device, the method including: discharging bit lines connected to a memory block, and applying a positive setting voltage to a source line connected to the memory block; applying a read voltage to a selected word line of the memory block; applying or blocking a power voltage to or from a common sensing node of each of page buffers respectively connected to the bit lines based on a potential level of each of the bit lines; and sensing data based on a current amount that is applied to the common sensing node of each of the page buffers.

In accordance with still another aspect of the present disclosure, there is provided a method of operating a semiconductor memory device, the method including: precharging bit lines connected to a memory block to a setting level, and applying a ground voltage to a source line connected to the memory block; applying a read voltage to a selected word line of the memory block; applying or blocking a power voltage to or from a common sensing node of each of page buffers respectively connected to the bit lines based on a potential level of each of the bit lines; and sensing data based on a current amount that is applied to the common sensing node of each of the page buffers.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Hereinafter, exemplary embodiments of the present disclosure will be described in detail with reference to the accompanying drawings in order for those skilled in the art to be able to readily implement the technical spirit of the present disclosure.

Embodiments provide a page buffer, a semiconductor memory having the page buffer, and an operating method thereof, which can increase a sensing margin of data in a read operation.

Figure 1:
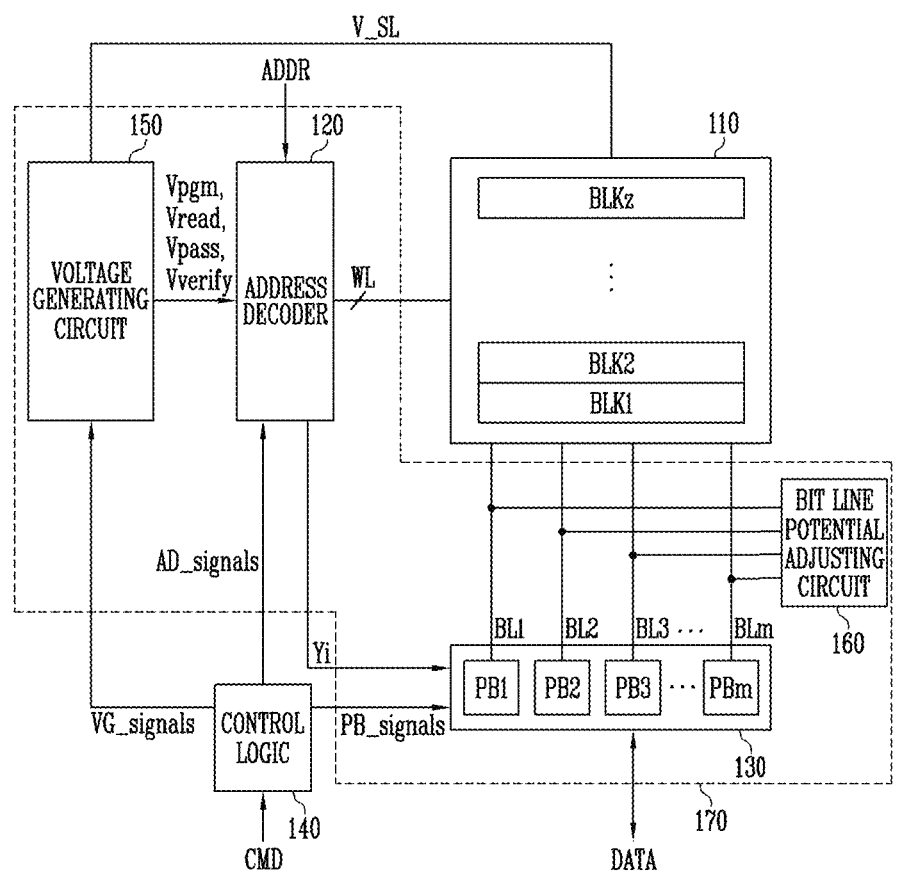
FIG. 1 is a diagram illustrating a semiconductor memory in accordance with an embodiment of the present disclosure.

FIG. 1 is a diagram illustrating a semiconductor memory in accordance with an embodiment of the present disclosure.

Referring to FIG. 1, the semiconductor memory device 100 may include a memory cell array 110, an address decoder 120, a read/write circuit 130, a control logic 140, a voltage generating circuit 150, and a bit line potential adjusting circuit 160. The address decoder 120, the read/write circuit 130, the voltage generating circuit 150, and the bit line potential adjusting circuit 160 may be defined as a peripheral circuit 170 that performs a read operation on the memory cell array 110. In another embodiment, the bit line potential adjusting circuit 160 may be disposed as a component included in the read/write circuit 130.

The memory cell array 110 may include a plurality of memory blocks BLK1 to BLKz. The plurality of memory blocks BLK1 to BLKz may be connected to the address decoder 120 through word lines WL. The plurality of memory blocks BLK1 to BLKz may be connected to the read/write circuit 130 through bit lines BL1 to BLm. Each of the plurality of memory blocks BLK1 to BLKz may include a plurality of m memory cells. In an embodiment, the plurality of memory cells may be nonvolatile memory cells. A plurality of memory cells, among the plurality of memory cells, connected to one word line, may be defined as one page. That is, the memory cell array 110 may be configured with a plurality of pages.

Each of the plurality of memory blocks BLK1 to BLKz of the memory cell array 110 may include a plurality of memory strings. Each of the plurality of memory strings may include a drain select transistor, a plurality of memory cells, and a source select transistor, which are connected in series between a bit line and a source line. Also, each of the plurality of memory strings may include a pass transistor between the source select transistor and the memory cells and a pass transistor between the drain select transistor and the memory cells. Furthermore, each of the plurality of memory strings may further include a pipe gate transistor between the memory cells. The memory cell array 110 will be described in detail later.

The address decoder 120 may be connected to the memory cell array 110 through the word lines WL. The address decoder 120 may operate in response to address decoder control signals AD_signals that are generated by the control logic 140. The address decoder 120 may receive an address ADDR through an input/output buffer (not shown) in the semiconductor memory device 100.

Based on the received address ADDR, the address decoder 120 may apply, to a plurality of memory cells of the memory cell array 110, a plurality of operating voltages including a program voltage Vpgm, a read voltage Vread, a pass voltage Vpass, and a verify voltage Vverify, which are generated by the voltage generating circuit 150.

The address decoder 120 may decode a column address in the received address ADDR. The address decoder 120 may transmit the decoded column address Yi to the read/write circuit 130.

An address ADDR received in the program operation or the read operation may include a block address, a row address, and a column address. The address decoder 120 may select one memory block and one word line according to the block address and the row address.

The address decoder 120 may include a block decoder, a row decoder, a column decoder, an address buffer, and the like.

The read/write circuit 130 may include a plurality of page buffers PB1 to PBm. The plurality of page buffers PB1 to PBm may be connected to the memory cell array 110 through the bit lines BL1 to BLm. The plurality of page buffers PB1 to PBm may perform a data sensing operation that senses a program state of memory cells connected to the bit lines BL1 to BLm in a read operation or a verify operation. In the sensing operation, each of the plurality of page buffers PB1 to PBm may latch data based on a potential level or a current amount of a corresponding bit line, among the bit lines BL1 to BLm. The plurality of page buffers PB1 to PBm may perform a data transmission operation that receives data to be programmed in a program operation and temporarily storing the received data and may adjust the potential level of a corresponding bit line, among the bit lines BL1 to BLm, based on the temporarily stored data.

The read/write circuit 130 may operate in response to page buffer control signals PB_signals that are output from the control logic 140.

In an exemplary embodiment, the read/write circuit 130 may include page buffers (or page registers), a column select circuit, and the like.

The control logic 140 may be connected to the address decoder 120, the read/write circuit 130, and the voltage generating circuit 150. The control logic 140 may receive a command CMD through the input/output buffer (not shown) of the semiconductor memory device 100. The control logic 140 may control the general operation of the semiconductor memory device 100 in response to the command CMD. For example, the control logic 140 may receive a command CMD corresponding to a program command and may generate and output address decoder control signals AD_signals for controlling the address decoder 120, page buffer control signals PB_signals for controlling the read/write circuit 130, and voltage generating circuit control signals VG_signals for controlling the voltage generating circuit 150 in response to a received command CMD. Also, the control logic 140 may receive a command corresponding to a read operation and may generate and outputs address decoder control signals AD_signals for controlling the address decoder 120, page buffer control signals PB_signals for controlling the read/write circuit 130, and voltage generating circuit control signals VG_signals for controlling the voltage generating circuit 150 in response to the received command CMD.

Under the control of the voltage generating circuit control signals VG_signals that are output from the control logic 140 in a program operation, the voltage generating circuit 150 may generate the program voltage Vpgm, the pass voltage Vpass, and the verify voltage Vverify and may output the generated voltages to the address decoder 120. Also, under the control of the voltage generating circuit control signals VG_signals that are output from the control logic 140 in a read operation, the voltage generating circuit 150 may generate the read voltage Vread and the pass voltage Vpass and output the generated voltages to the address decoder 120. In the read operation, the voltage generating circuit 150 may apply a source line voltage V_SL to a source line of a selected memory block, among the plurality of memory blocks BLK1 to BLKz, included in the memory cell array 110.

The bit line potential adjusting circuit 160 may be connected to the bit lines BL1 to BLm of the plurality of memory blocks BLK1 to BLKz that are included in the memory cell array 110 and may perform initial setting by discharging potentials of the bit lines BL1 to BLm in a read operation. In another embodiment, the bit line potential adjusting circuit 160 may perform initial setting by precharging the bit lines BL1 to BLm to a certain level in the read operation.

Figure 2:
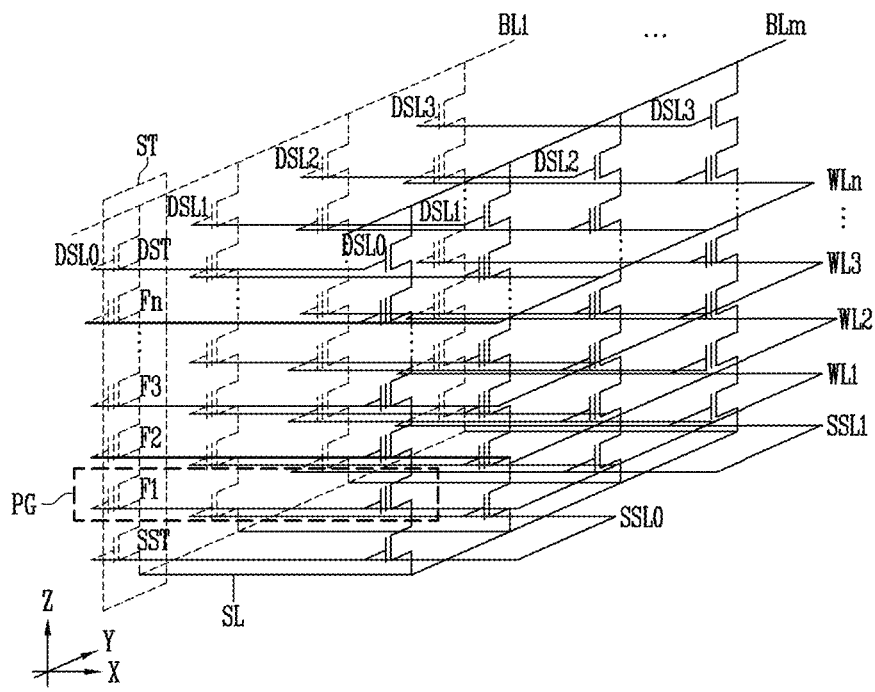
FIG. 2 is a circuit diagram illustrating in detail any one memory block shown in FIG. 1.

FIG. 2 is a circuit diagram illustrating in detail any one memory block shown in FIG. 1.

Referring to FIG. 2, each memory string ST may be connected between a corresponding bit line among bit lines BL1 to BLm and a source line SL. A memory string ST connected between a first bit line BL1 and the source line SL will be described as an example.

The memory string ST may include a source select transistor SST, memory cells F1 to Fn (n is a positive integer), and a drain select transistor DST, which are connected in series between the source line SL and the first bit line BL1. Gates of source select transistors SST, included in different memory strings ST, connected to different bit lines BL1 to BLm, may be connected to a first source select line SSL0 and may be connected to a second source select line SSL1. In an example, source select transistors that are adjacent to each other in a first direction X among the source select transistors SST may be connected to the same source select line. For example, when assuming that source select transistors SST are sequentially arranged along the first direction X, gates of source select transistors SST that are arranged in the first direction X from a first source select transistor SST and are included in different strings ST and gates of source select transistors SST that are arranged in the first direction X from a second source select transistor SST and are included in different strings ST may be connected to the first source select line SSL0. In addition, gates of source select transistors SST that are arranged in the first direction X from a third source select transistor SST and are included in different strings ST and gates of source select transistors SST that are arranged in the first direction X from a fourth source select transistor SST and are included in different strings ST may be connected to the second source select line SSL1.

Gates of the memory cells F1 to Fn may be connected to word lines WL1 to WLn, and gates of drain select transistors DST may be connected to any one of first to fourth drain select lines DSL0 to DSL3.

Gates of transistors, among the drain select transistors DST, arranged in the first direction X, may be commonly connected to the same drain select line (e.g., DSL0), but transistors that are arranged in a second direction Y may be connected to different drain select lines DSL1 to DSL3. For example, when assuming that drain select transistors DST are sequentially arranged along the second direction Y, gates of drain select transistors DST that are arranged in the first direction X from a first drain select transistor DST and are included in different strings ST may be connected to the first drain select line DSL0. Drain select transistors DST, arranged in the second direction Y from the drain select transistors DST that are connected to the first drain select line DSL0, may be sequentially connected to the second to fourth drain select lines DSL1 to DSL3. Therefore, in a selected memory block, memory strings ST connected to a selected drain select line may be selected, and memory strings ST connected to the other unselected drain selected lines may be unselected.

Memory cells connected to the same word line may constitute one page PG. The page may mean a physical page. For example, a group of memory cells connected in the first direction X on the same word line among the strings ST connected to the first bit line BL1 to an mth bit line BLm is referred to as a page PG. For example, memory cells that are arranged in the first direction X, among first memory cells F1 connected to a first word line WL1, may constitute one page PG. Memory cells that are arranged in the second direction Y, among the first memory cells F1 commonly connected to the first word line WL1, may constitute another page. Therefore, when the first drain select line DSL0 is a selected drain line and the first word line WL1 is a selected word line, a page connected to the first drain select line DSL0, among a plurality of pages PG connected to the first word line WL1, may become a selected page. Pages that are commonly connected to the first word line WL1 but are connected to the unselected second and fourth drain select lines DSL1 to DSL3 may become unselected pages.

Although a case in which one source select transistor SST and one drain select transistor DST are included in one memory string ST is illustrated in the drawings, a plurality of source select transistors SST and a plurality of drain select transistors DST may be included in one memory string ST, depending on a semiconductor memory device. In addition, dummy cells may be included between the source select transistor SST, the memory cells F1 to Fn, and the drain select transistor DST, depending on a semiconductor memory. The dummy cells might not store user data, like general memory cells F1 to Fn, but may be used to improve electrical characteristics of each memory string ST. However, the dummy cells are not essential components in this embodiment, and therefore, their detailed descriptions will be omitted.

Figure 3:
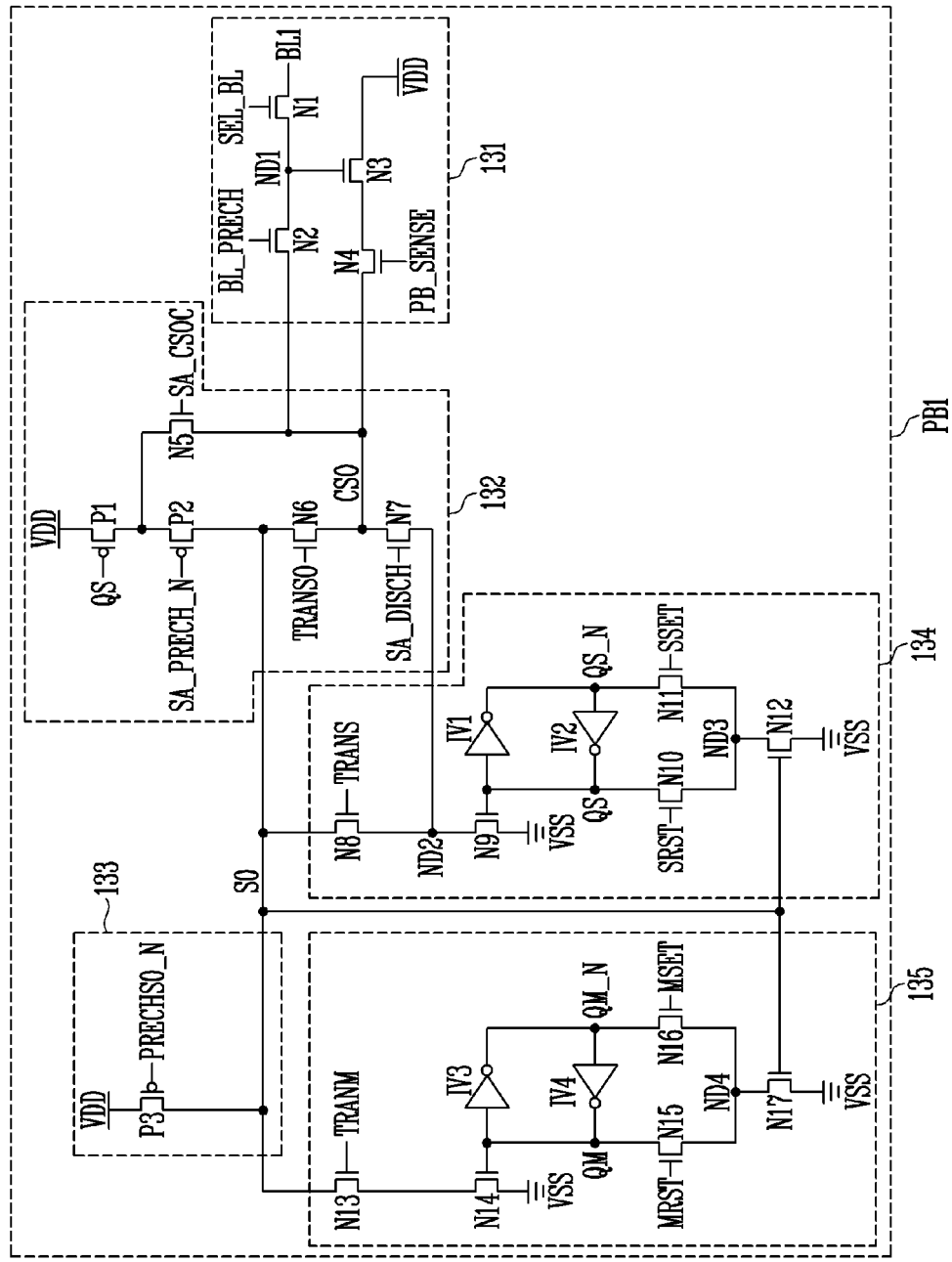
FIG. 3 is a circuit diagram illustrating a page buffer in accordance with an embodiment of the present disclosure.

FIG. 3 is a circuit diagram illustrating a page buffer in accordance with an embodiment of the present disclosure.

The plurality of page buffers PB1 to PBm included in the read/write circuit 130, shown in FIG. 1, may be designed to have similar structures. In the embodiment of the present disclosure, for convenience of description, a page buffer PB1 will be described as an example.

Referring to FIG. 3, the page buffer PB1 may include a first current supply circuit 131, a second current supply circuit 132, a sensing node precharge unit 133, a sub-latch unit 134, and a main latch unit 135.

The first current supply circuit 131 may connect or block a power voltage node VDD to or from a common sensing node CSO based on a potential of a bit line BL1, which is changed according to a program state of a memory cell connected to the bit line BL1 in a sensing operation of a read operation or a verify operation. For example, when the potential of the bit line BL1 is a low level (discharge level), the first current supply circuit 131 may block the power voltage node VDD from the common sensing node CSO. When the potential of the bit line BL1 is a high level (setting voltage level), the first current supply circuit 131 may connect the power voltage node VDD to the common sensing node CSO. For example, the discharge level at which a potential level of the bit line BL1 is lower than a threshold voltage of an NMOS transistor N3 may be defined as the low level, and the setting voltage level at which the potential level of the bit line BL1 is higher than the threshold voltage of m the NMOS transistor N3 may be defined as the high level.

The first current supply circuit 131 may include a plurality of NMOS transistors N1, N2, N3, and N4. NMOS transistors N1 and N2 may be connected in series between the bit line BL1 and the common sensing node CSO. An NMOS transistor N1 may be turned on in response to a bit line select signal SEL_BL, and an NMOS transistor N2 may be turned on in response to a bit line precharge signal BL_PRECH.

NMOS transistors N3 and N4 may be connected in series between the power voltage node VDD and the common sensing node CSO. The NMOS transistor N3 may be turned on in response to a potential of a node ND1 between the IMOS transistor N1 and the NMOS transistor N2, and an NMOS transistor N4 may be turned on in response to a page buffer sensing signal PB_SENSE. The NMOS transistors N3 and N4 may electrically connect the power voltage node VDD to the common sensing node CSO in response to the potential of the node ND1 and the page buffer sensing signal PB_SENSE. In another embodiment, the NMOS transistor N3 may be configured as a depletion NMOS transistor.

When a bit line potential level is the high level, the NMOS transistor N1 may be turned on in response to the bit line select signal SEL_BL, and the NMOS transistor N3 may be turned on in response to the potential of the node ND1 between the NMOS transistor N1 and the NMOS transistor N2, so that a power voltage is directly applied to the common sensing node CSO. Thus, a current amount that is applied to the common sensing node CSO can be increased. That is, the current amount that is applied to the common sensing node CSO can be increased by a current/voltage amplification effect that is caused by transconductance of the NMOS transistor N3.

The second current supply circuit 132 may control a potential level of a sensing node SO based on the current amount of the common sensing node CSO.

The second current supply circuit 132 may include a plurality of NMOS transistors N5, N6, and N7 and a plurality of PMOS transistors P1 and P2.

A PMOS transistor P1 and a PMOS transistor P2 may be connected in series between the power voltage node VDD and the sensing node SO, and each of the PMOS transistor P1 and the PMOS transistor P2 may be turned on in response to a node QS of the sub-latch unit 134 and a precharge signal SA_PRECH_N.

An NMOS transistor N5 may be connected between the common sensing node CSO and a node between the PMOS transistor P1 and the PMOS transistor P2 and may supply a power voltage that is supplied through the PMOS transistor P1 to the common sensing node CSO in response to a control signal SA_CSOC. An NMOS transistor N6 may be connected between the sensing node SO and the common sensing node CSO and may electrically connect the sensing node SO to the common sensing node CSO in response to a transmission signal TRANSO. An NMOS transistor N7 may be connected between the common sensing node CSO and a node ND2 of the sub-latch unit 134 and may electrically connect the common sensing node CSO to the node ND2 in response to a discharge signal SA_DISCH.

The sensing node precharge unit 133 may be connected between the sensing node SO and the power voltage node VDD to precharge the sensing node SO to a power voltage level.

The sensing node precharge unit 133 may include a PMOS transistor P3. The PMOS transistor P3 may apply a power voltage to the sensing node SO in response to a sensing node precharge signal PRECHSO_N.

The sub-latch unit 134 may include a plurality of NMOS transistors N8 to N12 and inverters IV1 and IV2.

The inverters IV1 and IV2 may be connected in reverse parallel between the node QS and a node QS_N to constitute a latch.

An NMOS transistor N8 and an NMOS transistor N9 may be connected in series between the sensing node SO and a ground voltage VSS. The NMOS transistor N8 may be turned on in response to a transmission signal TRANS, and the NMOS transistor N9 may be turned on or turned off according to a potential level of the node QS.

An NMOS transistor N10 may be connected between the node QS and a node ND3 to electrically connect the node QS to the node ND3 in response to a reset signal SRST. An NMOS transistor N11 may be connected between the node QS_N and the node ND3 to electrically connect the node QS_N to the node ND3 in response to a set signal SSET. An NMOS transistor N12 may be connected between the node ND3 and the ground voltage VSS and may be turned on according to a potential of the sensing node SO to electrically connect the node ND3 to the ground voltage VSS. For example, when the reset signal SRST is applied at logic high level to the NMOS transistor N10 in a state in which the sensing node SO is precharged to the high level, the node QS and the node QS_N may be respectively initialized to a logic low level and the logic high level. Also, when the set signal SSET is applied at the logic high level to the NMOS transistor 11 in the state in which the sensing node SO is precharged to the high level, the node QS and the node QS_N may be respectively set to the logic high level and the logic low level. In a data sensing operation, the node QS may be initially set to the logic low level.

The main latch unit 135 may include a plurality of NMOS transistors N13 to N17 and inverters IV3 and IV4.

The inverters IV3 and IV4 may be connected in reverse parallel between a node QM and a node QM_N to constitute a latch.

An NMOS transistor N13 and an NMOS transistor N14 may be connected in series between the sensing node SO and the ground voltage VSS. The NMOS transistor N13 may be turned on in response to a transmission signal TRANM, and the NMOS transistor N14 may be turned on or turned off according to a potential level of the node QM.

An NMOS transistor N15 may be connected between the node QM and a node ND4. The NMOS transistor N15 may be turned on or turned off in response to a reset signal MRST. An NMOS transistor N16 may be connected between the node QM_N and the node ND4 to electriconnect the node QM_N to the node ND4 in response to a set signal MSET. An NMOS transistor N17 may be connected between the node ND4 and the ground voltage VSS and may connect the node ND4 to the ground voltage VSS according to the potential of the sensing node SO.

An operation of the page buffer PB1 in a read operation or a verify operation will be described as follows.

The second current supply circuit 132 may precharge the sensing node SO and the common sensing node CSO. The PMOS transistor P1 and the PMOS transistor P2 may precharge the sensing node SO to the power voltage level in response to the node QS of the sub-latch unit 134, which is set to the logic low level, and the precharge signal SA_P-RECH_N of the logic low level.

The NMOS transistor N5 may be turned on in response to the control signal SA_CSOC, the NMOS transistor N6 may be turned on in response to the transmission signal TRANSO of the logic high level, and the common sensing node CSO may be precharged to a certain level (VDD-Vth).

The first current supply circuit 131 may connect or block the power voltage node VDD to or from the common sensing node CSO based on the potential level of the bit line BL1. The NMOS transistor N1 may be turned on in response to the bit line select signal SEL_BL. Each of the NMOS transistor N3 and the NMOS transistor N4 may electrically connect or block the power voltage node VDD to or from the common sensing node CSO in response to the potential of the node ND1 and the page buffer sensing signal PBSENSE. For example, the first current supply circuit 131 may block the power voltage node VDD from the common sensing node CSO when the potential of the bit line BL1 is the low level. For example, the first current supply circuit 131 may connect the power voltage node VDD to the common sensing node CSO when the potential of the bit line BL1 is the high level. Accordingly, when the bit line potential level is the high level, the power voltage can be applied directly to the common sensing node CSO, and thus, the current amount that is applied to the common sensing node CSO can be increased.

After that, the second current supply circuit 132 may perform an evaluation operation. The PMOS transistor P2 may be turned off in response to the precharge signal SA_PRECH_N that is changed to the logic high level, and the power voltage that is applied to the sensing node SO may be blocked. For example, when the potential level of the bit line BL1 is the discharge level as the low level according to the program state of the memory cell, no current may be applied to the common sensing node CSO, and accordingly, the potential of the sensing node SO may gradually drop to the discharge level. On the other hand, when the potential level of the bit line BL1 is the high level as a potential level of a setting voltage, the power voltage may be applied to the common sensing node CSO so that the potential of the sensing node SO maintains a precharge level.

The main latch unit 135 may sense data based on the potential level of the sensing node SO. The NMOS transistor N17 may be turned on or turned off in response to the potential level of the sensing node SO. Accordingly, the ground voltage VSS may be applied to the node ND4 or may be blocked from the node ND4 according to the potential level of the sensing node SO. After that, as the set signal MSET is applied, the NMOS transistor N16 may be turned on so that the node ND4 is connected to the node QM_N. For example, when the potential level of the sensing node SO is the precharge level, i.e., the logic high level, both the NMOS transistor N17 and the NMOS transistor N16 may be turned on so that the ground voltage VSS is applied to the node QM_N. On the other hand, when the potential level of the sensing node SO is the discharge level, i.e., the logic low level, the NMOS transistor N17 may be turned off so that the node QM_N maintains the high level as an initial level.

Figure 4:
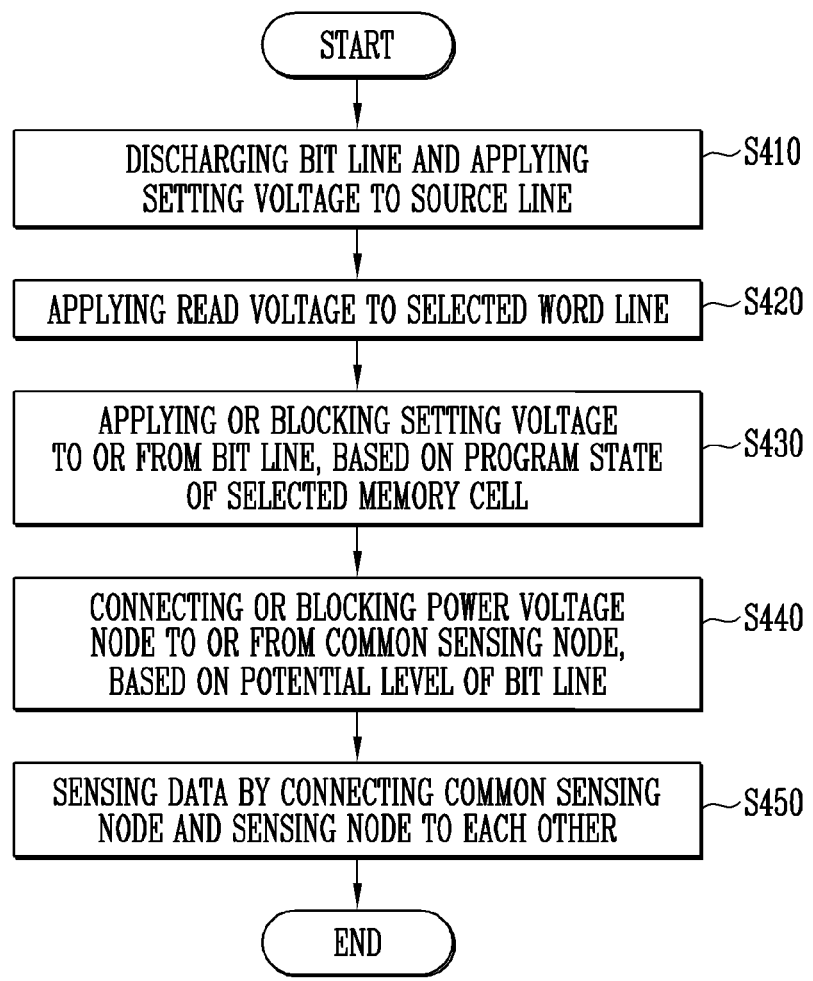
FIG. 4 is a flowchart illustrating a read operation of the semiconductor memory device in accordance with an embodiment of the present disclosure.

FIG. 4 is a flowchart illustrating a read operation of the semiconductor memory device in accordance with an embodiment of the present disclosure.

The read operation of the semiconductor memory device, in accordance with the embodiment of the present disclosure, will be described as follows with reference to FIGS. 1 to 4.

In step S410, the bit lines BL1 to BLm of a selected memory block (e.g., BLK1) on which the read operation is to be performed may be discharged, and a setting voltage V_SL may be applied to the source line SL of the selected memory block (e.g., BLK1).

For example, the bit line potential adjusting circuit 160 may discharge the bit lines BL1 to BLm to a ground voltage level by applying the ground voltage to the bit lines BL1 to BLm for a certain time. In addition, the voltage generating circuit 150 may apply the setting voltage V_SL to the source line SL of the selected memory block (e.g., BLK1). The setting voltage V_SL may be a positive voltage. For example, the setting voltage V_SL may be 1V.

In addition, as an initialization operation is performed on each of the plurality of page buffers PB1 to PBm, the node QM and the node QS of each of the plurality of page buffers PB1 to PBm may be set to the logic low level. In addition, the second current supply circuit 132 of each of the plurality of page buffers PB1 to PBm may precharge the sensing node SO and the common sensing node CSO.

In step S420, the voltage generating circuit 150 may generate and output the read voltage Vread and the pass voltage Vpass. The address decoder 120 may apply the read voltage Vread to a selected word line of the selected memory block (e.g., BLK1) and may apply the pass voltage Vpass to the other unselected word lines, in response to the address ADDR.

In step S430, according to a program state of the selected memory cell connected to the selected word line, the setting voltage may be applied to the bit lines BL1 to BLm or may be blocked from the bit lines BL1 to BLm.

For example, when a threshold voltage of the selected memory cell connected to the bit line BL1 is higher than the read voltage Vread, the selected memory cell may be turned off, and accordingly, the bit line BL1 may maintain the discharge level. On the other hand, when the threshold voltage of the selected memory cell connected to the bit line BL1 is lower than the read voltage Vread, the selected memory cell may be turned on, and accordingly, the setting voltage V_SL may be applied to the bit line BL1 so that the potential level rises.

In step S440, each of the plurality of page buffers PB1 to PBm may connect or block the power voltage node VDD to or from the common sensing node CSO based on a potential level of a corresponding bit line, among the bit lines BL1 to BLm.

For example, when the potential level of the corresponding bit line (e.g., BL1) is the discharge level, each of the plurality of page buffers PB1 to PBm may electrically block the power voltage node VDD from the common sensing node CSO. When the potential level of the corresponding bit line (e.g., BL1) is the setting voltage level, each of the plurality of page buffers PB1 to PBm may electrically connect the power voltage node VDD to the common sensing node CSO.

In step S450, the second current supply circuit 132 of each of the plurality of page buffers PB1 to PBm may connect the common sensing node CSO to the sensing node SO, and the main latch unit 135 of each of the plurality of page buffers PB1 to PBm may latch data based on the potential level of the sensing node SO.

For example, when the potential level of the bit line (e.g., BL1) is the discharge level, potential levels of the common sensing node CSO and the sensing node SO may drop to the discharge level. Based on the potential level of the sensing node SO, the main latch unit 135 may latch data by maintaining an initialization state, i.e., a state in which the node QM has the logic low level.

For example, when the potential level of the bit line (e.g., BL1) is the level of the setting voltage V_SL, the potential levels of the common sensing node CSO and the sensing node SO may maintain the high level due to the power voltage that is applied through the power voltage node VDD. Based on the potential level of the sensing node SO, the main latch unit 135 may latch data as the node QM_N is changed to have the logic low level.

Although the read operation of the semiconductor memory device has been described in the above-described embodiment, a program verify operation or an erase verify operation may be performed as an operating method of the same page buffer.

Figure 5:
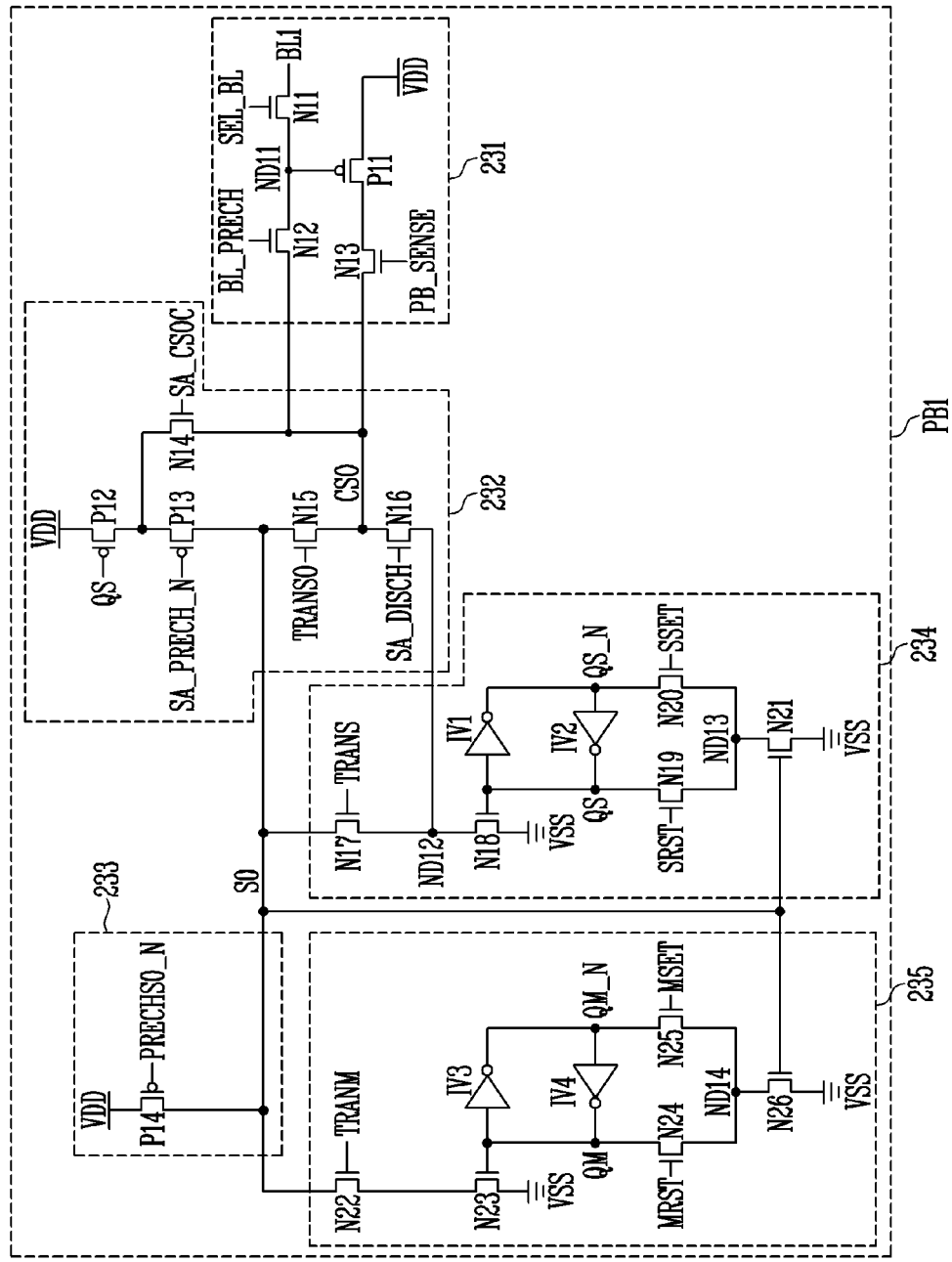
FIG. 5 is a circuit diagram illustrating a page buffer in accordance with another embodiment of the present disclosure.

FIG. 5 is a circuit diagram illustrating a page buffer in accordance with another embodiment of the present disclosure.

The plurality of page buffers PB1 to PBm included in the read/write circuit 130, shown in FIG. 1, may be designed to have structures similar to one another. In the embodiment of the present disclosure, for convenience of description, a page buffer PB1 will be described as an example.

Referring to FIG. 5, the page buffer PB1 may include a first current supply circuit 231, a second current supply circuit 232, a sensing m node precharge unit 233, a sub-latch unit 234, and a main latch unit 235.

The first current supply circuit 231 may connect or block a power voltage node VDD to or from a common sensing node CSO based on a potential of a bit line BL1, which is changed according to a program state of a memory cell connected to the bit line BL1 in a sensing operation of a read operation or a verify operation. For example, when the potential of the bit line BL1 is a high level (precharge level), the first current supply circuit 231 may block the power voltage node VDD from the common sensing node CSO. When the potential of the bit line BL1 is a low level (discharge level), the first current supply circuit 231 may connect the power voltage node VDD to the common sensing node CSO.

The first current supply circuit 231 may include a plurality of NMOS transistors N11, N12, and N13 and a PMOS transistor P11. NMOS transistors N11 and N12 may be connected in series between the bit line BL1 and the common sensing node CSO. An NMOS transistor N11 may be turned on in response to a bit line select signal SEL_BL, and an NMOS transistor N12 may be turned on in response to a bit line precharge signal BL_PRECH.

The PMOS transistor P11 and an NMOS transistor N13 may be connected in series between the power voltage node VDD and the common sensing node CSO. The PMOS transistor P11 may be turned on in response to a potential of a node ND11 between the NMOS transistor N11 and the NMOS transistor N12, and the NMOS transistor N13 may be turned on in response to a page buffer sensing signal PB_SENSE. The PMOS transistor P11 and the NMOS transistor N13 may electrically connect the power voltage node VDD to the common sensing node CSO in response to the potential of the node ND11 and the page buffer sensing signal PB_SENSE. In another embodiment, the PMOS transistor P11 may be configured as a depletion PMOS transistor.

When a bit line potential level is the discharge level, the NMOS transistor 11 may be turned on in response to the bit line select signal SEL_BL, and the PMOS transistor P11 may be turned on in response to the potential of the node ND11 between the NMOS transistor N11 and the NMOS transistor N12, so that a power voltage is applied directly to the common sensing node CSO. Thus, a current amount that is applied to the common sensing node CSO can be increased. That is, the current amount that is applied to the common sensing node CSO can be increased by a current/voltage amplification effect that is caused by transconductance of the PMOS transistor P11.

The second current supply circuit 232 may control a potential level of a sensing node SO based on the current amount of the common sensing node CSO.

The second current supply circuit 232 may include a plurality of NMOS transistors N14, N15, and N16 and a plurality of PMOS transistor P12 and P13.

A PMOS transistor P12 and a PMOS transistor P13 may be connected in series between the power voltage node VDD and the sensing node SO, and each of the PMOS transistor P12 and the PMOS transistor P13 may be turned on in response to a node QS of the sub-latch unit 234 and a precharge signal SA_PRECH_N.

An NMOS transistor N14 may be connected between the common sensing node CSO and a node between the PMOS transistor P12 and the PMOS transistor P13 and may supply a power voltage that is supplied through the PMOS transistor P12 to the common sensing node CSO in response to a control signal SA_CSOC. An NMOS transistor N15 may be connected between the sensing node SO and the common sensing node CSO and may electrically connect the sensing node SO to the common sensing node CSO in response to a transmission signal TRANSO. An NMOS transistor N16 may be connected between the common sensing node CSO and a node ND12 of the sub-latch unit 234 and may electrically connect the common sensing node CSO to the node ND12 in response to a discharge signal SA_DISCH.

The sensing node precharge unit 233 may be connected between the sensing node SO and the power voltage node VDD to precharge the sensing node SO to a power voltage level.

The sensing node precharge unit 233 may include a PMOS transistor P14, and the PMOS transistor P14 may apply a power voltage in response to the sensing node precharge signal PRECHSO_N.

The sub-latch unit 234 may include a plurality of NMOS transistors N17 to N21 and inverters IV1 and IV2.

The inverters IV1 and IV2 may be connected in reverse parallel between the node QS and a node QS_N to constitute a latch.

An NMOS transistor N17 and an NMOS transistor N18 may be connected in series between the sensing node SO and a ground voltage VSS. The NMOS transistor N17 may be turned on in response to a transmission signal TRANS, and the NMOS transistor N18 may be turned on or turned off according to a potential level of the node QS.

An NMOS transistor N19 may be connected between the node QS and a node ND13 to electrically connect the node QS to the node ND13 in response to a reset signal SRST. An NMOS transistor N20 may be connected between the node QS_N and the node ND13 to electrically connect the node QS_N to the node ND13 in response to a set signal SSET. An NMOS transistor N21 may be connected between the node ND13 and the ground voltage VSS and may be turned on according to a potential of the sensing node SO to electrically connect the node ND13 to the ground voltage VSS. For example, when the reset signal SRST is applied at a logic high level to the NMOS transistor N19 in a state in which the sensing node SO is precharged to the high level, the node QS and the node QS_N may be respectively initialized to the logic low level and a logic high level. Also, when the set signal SSET is applied at the logic high level to the NMOS transistor N20 in the state in which the sensing node SO is precharged to the high level, the node QS and the node QS_N may be respectively set to the logic high level and the logic low level. In a data sensing operation, the node QS may be initially set to the logic low level.

The main latch unit 235 may include a plurality of NMOS transistor N22 to N26 and inverters IV3 and IV4.

The inverters IV3 and IV4 may be connected in reverse parallel between a node QM and a node QM_N to constitute a latch.

An NMOS transistor N22 and an NMOS transistor N23 may be connected in series between the sensing node SO and the ground voltage VSS. The NMOS transistor N22 may be turned on in response to a transmission signal TRANM, and the NMOS transistor N23 may be turned on or turned on according to a potential level of the node QM.

An NMOS transistor N24 may be connected between the node QM and a node ND14. The IMOS transistor N24 may be turned on or turned off in response to a reset signal MRST. An NMOS transistor N25 may be connected between the node QM_N and the node ND14 to electrically connect the node QM_N to the node ND14 in response to a set signal MSET. An NMOS transistor N26 may be connected between the node ND14 and the ground voltage VSS and may connect the node ND14 to the ground voltage VSS according to the potential of the sensing node SO.

An operation of the page buffer PB1 in a read operation or a verify operation will be described as follows.

The second current supply circuit 232 may precharge the sensing node SO and the common sensing node CSO. The PMOS transistor P12 and the PMOS transistor P13 may precharge the sensing node SO to the power voltage level in response to the node QS of the sub-latch unit 234, which is set to the logic low level, and the precharge signal SA_PRECH_N of the logic low level.

The NMOS transistor N14 may be turned on in response to the control signal SA_CSOC, the NMOS transistor N15 may be turned on in response to the transmission signal TRANSO of the logic high level, and the common sensing node CSO may be precharged to a certain level (VDD-Vth).

The first current supply circuit 231 may connect or block the power voltage node VDD to or from the common sensing node CSO based on the potential level of the bit line BL1. The NMOS transistor N11 may be turned on in response to the bit line select signal SEL_BL. Each of the PMOS transistor P11 and the PMOS transistor P13 may electrically connect or block the power voltage node VDD to or from the common sensing node CSO in response to the potential of the node ND11 and the page buffer sensing signal PB_SENSE. For example, the first current supply circuit 231 may block the power voltage node VDD from the common sensing node CSO when the potential of the bit line BL1 is the precharge level. For example, the first current supply circuit 231 may connect the power voltage node VDD to the common sensing node CSO when the potential of the bit line BL1 is the discharge level. Accordingly, when the bit line potential level is the discharge level, the power voltage can be applied directly to the common sensing node CSO, and thus, the current amount that is applied to the common sensing node CSO can be increased.

After that, the second current supply circuit 232 may perform an evaluation operation. The PMOS transistor P13 may be turned off in response to the precharge signal SA_PRECH_N changed to the logic high level, and the power voltage that is applied to the sensing node SO may be blocked. For example, when the potential level of the bit line BL1 maintains the precharge level according to the program state of the memory cell, no current may be applied to the common sensing node CSO, and accordingly, the potential of the sensing node SO may gradually drop to the discharge level. On the other hand, when the potential level of the bit line BL1 is discharged to the discharge level, the power voltage may be applied to the common sensing node CSO so that the potential of the sensing node SO maintains a precharge level.

The main latch unit 235 may sense data based on the potential level of the sensing node SO. The NMOS transistor N26 may be turned on or turned off in response to the potential level of the sensing node SO. Accordingly, the ground voltage VSS may be applied or blocked to or from the node ND14 according to the potential level of the sensing node SO. After that, as the set signal MSET is applied, the NMOS transistor N25 may be turned on so that the node ND14 is connected to the node QM_N. For example, when the potential level of the sensing node SO is the precharge level, i.e., the logic high level, both the NMOS transistor N26 and the NMOS transistor N25 may be turned on so that the ground voltage VSS is applied to the node QM_N. On the other hand, when the potential level of the sensing node SO is the discharge level, i.e., the logic low level, the NMOS transistor N26 may be turned off so that the node QM_N maintains the high level as an initial level.

Figure 6:
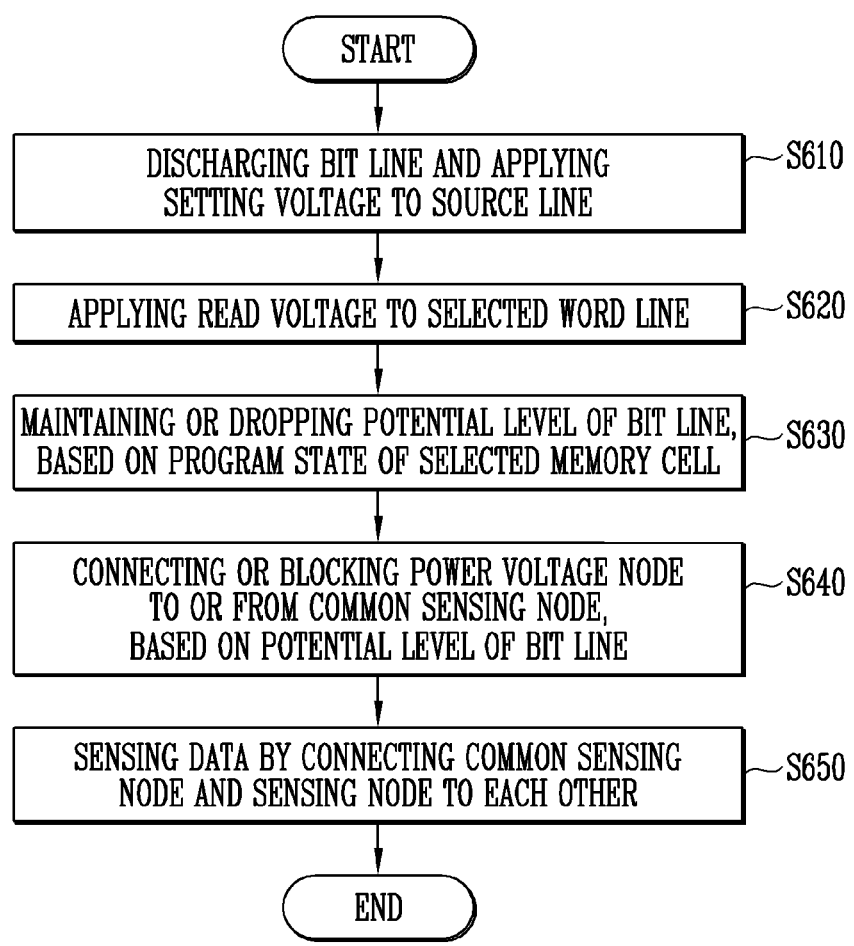
FIG. 6 is a flowchart illustrating a read operation of the semiconductor memory device in accordance with another embodiment of the present disclosure.

FIG. 6 is a flowchart illustrating a read operation of the semiconductor memory device in accordance with another embodiment of the present disclosure.

The read operation of the semiconductor memory device, in accordance with another embodiment of the present disclosure, will be described as follows with reference to FIGS. 1, 2, 5, and 6.

In step S610, the bit lines BL1 to BLm of a selected memory block (e.g., BLK1) on which the read operation is to be performed may be precharged, and a ground voltage may be applied to the source line SL of the selected memory block (e.g., BLK1).

For example, the bit line potential adjusting circuit 160 may precharge the bit lines BL1 to BLm by applying a power voltage to the bit lines BL1 to BLm for a certain time. In addition, the voltage generating circuit 150 may apply a setting voltage V_SL to the source line SL of the selected memory block (e.g., BLK1). The setting voltage V_SL may be the ground voltage.

In addition, as an initialization operation is performed on each of the plurality of page buffers PB1 to PBm, the node QM and the node QS of each of the plurality of page buffers PB1 to PBm may be set to the logic low level. In addition, the second current supply circuit 232 of each of the plurality of page buffers PB1 to PBm may precharge the sensing node SO and the common sensing node CSO.

In step S620, the voltage generating circuit 150 may generate and output the read voltage Vread and the pass voltage Vpass. In response to the address ADDR, the address decoder 120 may apply the read voltage Vread to a selected word line of the selected memory block (e.g., BLK1) and may apply the pass voltage Vpass to the other unselected word lines.

In step S630, the bit lines BL1 to BLm may maintain a precharge voltage level or may be discharged to a ground voltage level according to a program state of the selected memory cell connected to the selected word line.

For example, when a threshold voltage of the selected memory cell connected to the bit line BL1 is higher than the read voltage Vread, the selected memory cell may be turned off, and accordingly, the bit line BL1 may maintain the precharge level. On the other hand, when the threshold voltage of the selected memory cell connected to the bit line BL1 is lower than the read voltage Vread, the selected memory cell may be turned on, and accordingly the bit line BL1 may be discharged to the ground voltage level.

In step S640, each of the plurality of page buffers PB1 to PBm may connect or block the power voltage node VDD to or from the common sensing node CSO based on a potential level of a corresponding bit line, among the bit lines BL1 to BLm.

For example, when the potential level of the corresponding bit line (e.g., BL1) is the discharge level, each of the plurality of page buffers PB1 to PBm may electrically block the power voltage node VDD from the common sensing node CSO. When the potential level of the corresponding bit line (e.g., BL1) is the precharge level, each of the plurality of page buffers PB1 to PBm may electrically connect the power voltage node VDD to the common sensing node CSO.

In step S650, based on the potential level of the sensing node SO, the second current supply circuit 232 of each of the plurality of page buffers PB1 to PBm may connect the common sensing node CSO to the sensing node SO, and the main latch unit 235 of each of the plurality of page buffers PB1 to PBm may latch data.

For example, when the potential level of the bit line (e.g., BL1) is the precharge level, potential levels of the common sensing node CSO and the sensing node SO may drop to the discharge level. The main latch unit 235 may latch data by maintaining an initialization state, i.e., a state in which the node QM has the logic low level, based on the potential level of the sensing node SO.

For example, when the potential level of the bit line (e.g., BL1) is the level of the discharge level, the potential levels of the common sensing node CSO and the sensing node SO may maintain the high level due to the power voltage that is applied through the power voltage node VDD. The main latch unit 235 may latch data as the node QM_N is changed to have the logic low level based on the potential level of the sensing node SO.

Although the read operation of the semiconductor memory device has been described in the above-described embodiment, a program verify operation or an erase verify operation may be performed as an operating method of the same page buffer.

Figure 7:
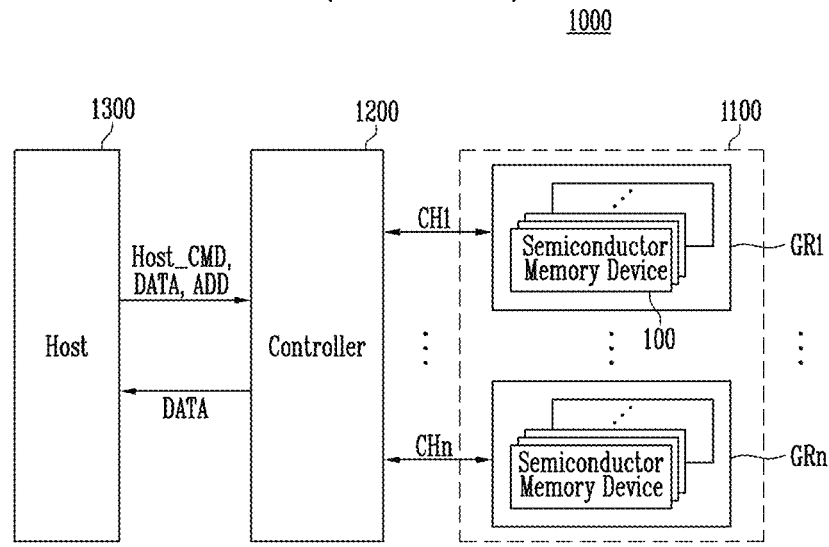
FIG. 7 is a block diagram illustrating a memory system including the semiconductor memory device in accordance with an embodiment of the present disclosure.

FIG. 7 is a block diagram illustrating a memory system including the semiconductor memory device in accordance with an embodiment of the present disclosure.

Referring to FIG. 7, the memory system 1000 may include a memory device 1100, a controller 1200, and a host 1300. The memory device 1100 may include a plurality of semiconductor memory devices 100. The plurality of semiconductor memory devices 100 may be divided into a plurality of groups GR1 to GRn. Although a case where the host 1300 is included in the memory system 1000 is illustrated and described in the embodiment of the present disclosure, the memory system 1000 may include only the controller 1200 and the memory device 1100, and the host 1300 may be disposed outside of the memory system 1000.

In FIG. 7, it is illustrated that the plurality of groups GR1 to GRn of the memory device 1100 communicate with the controller 1200, respectively, through first to nth channels CH1 to CHn. Each semiconductor memory device 100 may be a semiconductor memory device described with reference to FIG. 1.

Each of the plurality of groups GR1 to GRn may communicate with the controller 1200 through one common channel. The controller 1200 may control the plurality of semiconductor memory devices 100 of the memory device 1100 through the plurality of channels CH1 to CHn.

The controller 1200 is connected between the host 1300 and the memory device 1100. The controller 1200 accesses the memory device 1100 in response to a request from the host 1300. For example, the controller 1200 may control read, program, erase, and background operations of the memory device 1100 in response to a host command Host_CMD that is received from the host 1300. In a program operation, the host 1300 may transmit an address ADD and data DATA to be programmed together with the host command Host_CMD. In a read operation, the host 1300 may transmit an address ADD together with the host command Host_CMD. In a program operation, the controller 1200 may transmit a command corresponding to the program operation and data DATA to be programmed to the memory device 1100. In a read operation, the controller 1200 may transmit a command corresponding to the read operation to the memory device 1100, receive read data DATA from the memory device 1100, and transmit the received data DATA to the host 1300. The controller 1200 may provide an interface between the memory device 1100 and the host 1300. The controller 1200 may drive firmware for controlling the memory device 1100.

The host 1300 may include portable electronic devices such as a computer, a PDA, a PMP, an MP3 player, a camera, a camcorder, and a mobile phone. The host 1300 may request a program operation, a read operation, an erase operation, etc. of the memory system 1000 through a host command Host_CMD. For the purpose of a program operation, the host 1300 may transmit a host command Host_CMD corresponding to the program operation, data DATA, and an address ADD to the controller 1200. For the purpose of a read operation, the host may transmit a host command Host_CMD corresponding to the read operation and an address ADD to the controller 1200. The address ADD may be a logical address block of data.

The controller 1200 and the memory device 1100 may be integrated into one semiconductor memory. In an exemplary embodiment, the controller 1200 and the memory device 1100 may be integrated into one semiconductor memory, to constitute a memory card.

In accordance with the present disclosure, a sensing margin is increased in a read operation of the semiconductor memory device, thereby accurately sensing a program state of a memory cell even at a low cell current. Accordingly, the reliability of the read operation can be improved.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made based on the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made based on the technological scope of the present disclosure in addition to the embodiments disclosed herein.

What is claimed is:

1. A page buffer comprising:
   a first current supply circuit connected to a bit line, the first current supply circuit configured to connect or block a power voltage node to or from a common sensing node based on a potential level of the bit line;
   a second current supply circuit configured to control a potential level of a sensing node based on a current amount of the common sensing node; and
   a latch unit configured to latch data based on a potential of the sensing node.

2. The page buffer of claim 1, wherein the first current supply circuit includes a transistor connected between the power voltage node and the common sensing node, the transistor connecting or blocking the power voltage node to or from the common sensing node in response to the potential level of the bit line.

3. The page buffer of claim 2, wherein the transistor is configured as an NMOS transistor or a depletion NMOS transistor.

4. The page buffer of claim 2, wherein the transistor is configured as a PMOS transistor or a depletion PMOS transistor.

5. The page buffer of claim 1, wherein the first current supply circuit is configured to electrically separate the common sensing node from the power voltage node when the potential level of the bit line maintains a discharge level that is in an initial state and configured to electrically connect the common sensing node to the power voltage node when the potential level of the bit line rises from the discharge level to a setting voltage level.

6. The page buffer of claim 1, wherein the first current supply circuit is configured to electrically separate the common sensing node from the power voltage node when the potential level of the bit line maintains a precharge level that is in an initial state and configured to electrically connect the common sensing node to the power voltage node when the potential level of the bit line drops from the precharge level to a discharge level.

7. A semiconductor memory device comprising:
   a memory block including a plurality of memory strings;
   a voltage generating circuit configured to, in a read operation, generate:
   a source line voltage, which is to be applied to a source line of the memory block;
   a read voltage and a pass voltage, which are to be applied to word lines of the memory block;
   a bit line potential adjusting circuit connected to bit lines of the memory block, the bit line potential adjusting circuit performing initial setting by discharging a potential level of the bit lines in the read operation; and
   a read/write circuit connected to the bit lines, the read/write circuit sensing data by amplifying a current amount that is applied to a common sensing node based on the potential level of the bit line.

8. The semiconductor memory device of claim 7, wherein the read/write circuit includes a plurality of page buffers respectively connected to the bit lines, and
   wherein each of the plurality of page buffers includes:
   a first current supply circuit connected to any one bit line, among the bit lines, the first current supply circuit configured to connect or block a power voltage node to or from the common sensing node based on a potential level of the connected bit line in the read operation;
   a second current supply circuit configured to control a potential level of a sensing node based on the current amount of the common sensing node; and
   a latch unit configured to latch data based on a potential of the sensing node.

9. The semiconductor memory device of claim 8, wherein the first current supply circuit includes a transistor connected between the power voltage node and the common sensing node, the transistor connecting or blocking the power voltage node to or from the common sensing node in response to the potential level of the connected bit line.

10. The semiconductor memory device of claim 9, wherein the transistor is configured as an NMOS transistor or a depletion NMOS transistor.

11. The semiconductor memory device of claim 8, wherein the first m current supply circuit is configured to electrically separate the common sensing node from the power voltage node when the potential level of the connected bit line maintains a discharge level that is in an initial state and configured to electrically connect the common sensing node to the power voltage node when the potential level of the connected bit line rises from the discharge level to a setting voltage level.

12. A semiconductor memory device comprising:
   a memory block including a plurality of memory strings;
   a voltage generating circuit configured to, in a read operation, apply a ground voltage to a source line of the memory block and generate a read voltage and a pass voltage, which are to be applied to word lines of the memory block;
   a bit line potential adjusting circuit connected to bit lines of the memory block, the bit line potential adjusting circuit performing initial setting by precharging a potential level of the bit lines to a certain level in the read operation; and
   a read/write circuit connected to the bit lines, the read/write circuit sensing data by amplifying a current amount that is applied to a common sensing node based on the potential level of the bit line.

13. The semiconductor memory device of claim 12, wherein the read/write circuit includes a plurality of page buffers respectively connected to the bit lines, and
   wherein each of the plurality of page buffers includes:
   a first current supply circuit connected to any one bit line among the bit lines, the first current supply circuit configured to connect or block a power voltage node to or from the common sensing node based on a potential level of the connected bit line in the read operation;

a second current supply circuit configured to control a potential level of a sensing node based on the current amount of the common sensing node; and a latch unit configured to latch data based on a potential of the sensing node.

14. The semiconductor memory device of claim 13, wherein the first current supply circuit includes a transistor connected between the power voltage node and the common sensing node, the transistor connecting or blocking the power voltage node to or from the common sensing node in response to the potential level of the connected bit line.

15. The semiconductor memory device of claim 14, wherein the transistor is configured as a PMOS transistor or a depletion PMOS transistor.

16. The semiconductor memory device of claim 13, wherein the first current supply circuit is configured to electrically separate the common sensing node from the power voltage node when the potential level of the bit line maintains a precharge level that is in an initial state and configured to electrically connect the common sensing node to the power voltage node when the potential level of the bit line drops from the precharge level to a discharge level.

17. A method of operating a semiconductor memory device, the method comprising:

discharging bit lines connected to a memory block and applying a positive setting voltage to a source line connected to the memory block;

applying a read voltage to a selected word line of the memory block;

applying or blocking a power voltage to or from a common sensing node of each of page buffers respectively connected to the bit lines based on a potential level of each of the bit lines; and sensing data based on a current amount that is applied to the common sensing node of each of the page buffers.

18. The method of claim 17, wherein, in the applying or blocking of the power voltage to or from the common sensing node, a power voltage node to which the power voltage is applied is electrically blocked from the common sensing node when a potential level of a bit line corresponding to the common sensing node maintains a discharge level which is in an initial state, and the power voltage node is electrically connected to the common sensing node when the potential level of the bit line corresponding to the common sensing node rises from the discharge level which is in the initial level to a positive setting voltage level.

19. A method of operating a semiconductor memory device, the method comprising:

precharging bit lines connected to a memory block to a setting level and applying a ground voltage to a source line connected to the memory block;

applying a read voltage to a selected word line of the memory block;

applying or blocking a power voltage to or from a common sensing node of each of page buffers respectively connected to the bit lines based on a potential level of each of the bit lines; and sensing data based on a current amount that is applied to the common sensing node of each of the page buffers.

20. The method of claim 19, wherein, in the applying or blocking of the power voltage to or from the common sensing node, a power voltage node to which the power voltage is applied is electrically blocked from the common sensing node when a potential level of a bit line corresponding to the common sensing node maintains a precharge level which is in an initial state, and the power voltage node is electrically connected to the common sensing node when the potential level of the bit line corresponding to the common sensing node drops from the precharge level which is in the initial level to a discharge level.

\* \* \* \* \*